United States Patent [19]

Huang

[11] 3,920,615
[45] Nov. 18, 1975

[54] PRODUCTION OF ALKYLARYL SULFONATES INCLUDING THE STEP OF DEHYDROGENATING NORMAL PARAFFINS WITH AN IMPROVED CATALYST

[75] Inventor: Shuan K. Huang, Creve Coeur, Mo.

[73] Assignee: Monsanto Company, St. Louis, Mo.

[22] Filed: Aug. 30, 1974

[21] Appl. No.: 501,910

[52] U.S. Cl. ............. 260/683.3; 252/466; 260/505; 260/671
[51] Int. Cl.² ..................... C07C 3/28; C07C 77/00; C07C 143/24
[58] Field of Search.................. 260/683.3; 252/466

[56] References Cited
UNITED STATES PATENTS

| | | | |
|---|---|---|---|
| 1,271,013 | 7/1918 | Bosch et al. ...................... | 260/683.3 |
| 2,211,219 | 8/1940 | Thacker........................... | 260/683.3 |
| 3,156,735 | 10/1964 | Armstrong....................... | 252/466 X |
| 3,161,605 | 12/1964 | Beck et al........................ | 252/466 X |
| 3,228,991 | 1/1966 | Dulaney et al................... | 252/466 X |
| 3,312,734 | 4/1967 | Jones................................ | 260/505 |
| 3,315,008 | 4/1967 | Abell et al. ..................... | 260/683.3 |
| 3,585,253 | 6/1971 | Huang et al. .................... | 260/683.3 |

*Primary Examiner*—Delbert E. Gantz
*Assistant Examiner*—Juanita D. M. Nelson
*Attorney, Agent, or Firm*—Thomas N. Wallin; J. E. Maurer; Neal E. Willis

[57] ABSTRACT

Methods for preparing detergent-type alkylaryl sulfonates include the steps of dehydrogenating normal paraffins to form mono-olefins, reacting the mono-olefins with a monocyclic aryl compound such as benzene, and sulfonating the resulting alkylaryl hydrocarbon. Dehydrogenation catalysts comprising one or more of Group IB metals, such as copper, and one or more noble metals of the platinum or palladium families, deposited on alumina are employed for the dehydrogenation of normal paraffins. It has been found that the formation of byproducts during the conversion of normal paraffins to mono-olefins is decreased when the Group IB metals and noble metals of the platinum or palladium families are deposited on alumina that has been calcined at a temperature of at least 800°C. to reduce the surface area of the alumina to between about 10 m²/g and about 150 m²/g.

10 Claims, No Drawings

PRODUCTION OF ALKYLARYL SULFONATES INCLUDING THE STEP OF DEHYDROGENATING NORMAL PARAFFINS WITH AN IMPROVED CATALYST

BACKGROUND OF THE INVENTION

This invention relates to the preparation of biodegradable alkylbenzene sulfonate detergent materials and to intermediates useful in the preparation of such detergent materials, and more particularly, the invention relates to processes for producing detergent materials wherein a long-chain paraffin is dehydrogenated to produce a mono-olefin utilizing an improved dehydrogenation catalyst.

Alkylaryl sulfonates are a widely known class of chemicals that find ready application as surfactants, and particularly, in detergent formulations such as household laundry detergents. Millions of pounds of alkylaryl sulfonates are manufactured each year to satisfy these needs.

At the present time, these alkylbenzene sulfonate surfactant materials are prepared by the following process. Paraffin materials, separated from petroleum oils or obtained from other suitable sources, are dehydrogenated using a dehydrogenation catalyst to produce a material containing long-chain mono-olefins. The long-chain mono-olefins thus produced are reacted with a monocyclic aromatic material, such as benzene, to produce a detergent alkylate which can be sulfonated to produce an organic anionic detergent active material. Numerous dehydrogenation catalysts have been suggested for use in conducting the dehydrogenation of long-chain paraffin materials, and a dehydrogenation catalyst which comprises one or more Group IB metals, such as copper, and one or more noble metals of the platinum or palladium families deposited on low acidity alumina, such as those described in U.S. Pat. No. 3,585,253, are employed for the dehydrogenation of normal paraffins.

But, all of the catalysts available prior to this invention for the dehydrogenation of long-chain paraffin materials to produce mono-olefins have had certain disadvantages. The most serious of such disadvantages is a tendency to produce relatively large amounts of by-products, including diolefins, triolefins and/or aromatics. The production of such byproducts not only produces possible sources of contamination for the finished detergent material, but also results in decreased yields and the necessity of operating at low conversion rates to favor the production of mono-olefins.

SUMMARY OF THE INVENTION

It is an object of this invention to provide an improved process for preparing detergent-type alkylaryl sulfonates. It is another object to prepare detergent-type alkylaryl sulfonates from mono-olefins using an improved catalyst to dehydrogenate paraffins to form mono-olefins.

These and other objects are provided in a process for producing mono-olefins from paraffins having a chain-length of from about 8 to about 24 carbon atoms, which comprises passing a mixture of paraffins and hydrogen at an LHSV of from about 1 to about 100 cc/cc/hr. at a temperature of from about 400°C. to about 650°C. in contact with a catalyst comprising: from about 0.002 weight percent to about 5 weight percent of a first component selected from the group consisting of Group IB metals, oxides of Group IB metals and mixtures thereof; from about 0.005 weight percent to about 5 weight percent of a second component selected from the group consisting of noble metals of the platinum and palladium families, noble metal oxides of the platinum and palladium families, and mixtures thereof, the first and second components being deposited on the surface of an alumina catalyst base having a surface area of at least 10 square meters per gram ($m^2/g$), an acidity factor less than 2.0 weight percent, and a macropore volume of at least 0.05 cubic centimeters per gram (cc/g), the improvement which comprises calcining the alumina catalyst base at a temperature of at least about 800°C. for a sufficient time to reduce the surface area of the alumina catalyst base to less than about 150 $m^2/g$.

For the purposes of this invention, the term LHSV shall mean the hourly volume of liquid hydrocarbon feed, expressed in cubic centimeters (cc) at 25°C. and standard atmospheric pressure, divided by the catalyst bulk volume expressed in cubic centimeters, the term expressed as cc/cc/hr. The term "macropore volume" shall mean the total volume of pores expressed in cc, having a diameter equal to or greater than about 700 angstroms per unit weight, expressed in grams (g), of alumina and is measured using an Aminco-Winslow mercury porosimeter Model 5-7107 (American Instrument Company), or equivalent apparatus to determine the pore volume penetrated between 0 and 170 atmospheres, the term expressed as cc/g. The term "acidity factor" shall mean the cracking that results from passing a hydrocarbon mixture in contact with an alumina catalyst base at 435° to 440°C., the term expressed as weight percent (wt. %).

Broadly described, the process of this invention for preparing detergent-type alkylaryl sulfonates includes the steps of separating normal paraffins from a petroleum fraction, dehydrogenating the normal paraffins to form mono-olefins, reacting the mono-olefins with a monocyclic aryl compound, such as benzene, and sulfonating the resulting alkylaryl hydrocarbon. The novel dehydrogenation catalyst of this invention comprises a metal or metal oxide of an element from Group IB of the Periodic Table of the Elements and a noble metal or noble metal oxide of the platinum or palladium families deposited upon an alumina catalyst base having a surface area of at least about 10 $m^2/g$ but less than about 150 $m^2/g$, by calcining the alumina catalyst base at a temperature of at least 800°C. Optionally, a metal or metal oxide from Group IA of the Periodic Table of the Elements may be deposited on the alumina support to reduce the acidity of the alumina support. Such a catalyst provides a remarkable high conversion to mono-olefins with a selectivity such that the amounts of undesirable byproducts produced are exceedingly low as compared to products produced utilizing prior art catalysts.

The paraffin materials utilized in accordance with this invention can be derived from any suitable source and can, for example, be prepared by reduction of long-chain aliphatics produced by Fischer-Tropsch synthesis or by any other suitable means. The desired normal paraffins, however, are most readily obtained from petroleum sources by known methods of separation. For example, a suitable paraffin material can be obtained by passing a petroleum fraction of a boiling range selected to include paraffins of the proper chain length for use as detergents, through a molecular sieve bed containing a synthetic zeolite having a pore diameter of from 5 to 15 angstroms and preferably a pore size of about 5 angstroms. Such molecular sieves and methods for their use in separating paraffins from petroleum feed stocks are well known in the art and the molecular sieve materials are commercially available from numerous suppliers.

Since, by most production techniques, a mixture of normal paraffins of varying chain lengths is obtained rather than a single normal paraffin, it is an advantage of this invention that a mixture of normal paraffins can be employed. In fact, for most applications comparable results can be obtained with a mixture having an average chain length equal to the single chain length of pure normal olefin found to be most desirable for the particular end use of interest, provided that one selects the mixture such that the range of chain lengths is not more than about 6 carbon atoms, and preferably not more than about 3 or about 4 carbon atoms from the desired single chain length of pure normal olefins. For example, if n-dodecylbenzene sulfonate has been found to be the most desirable surfactant for a particular end use application, results comparable to those using n-dodecylbenzene sulfonate can be obtained by using a mixture of n-alkylbenzene sulfonates having an average chain length of 12 and wherein the homolog range for the alkyl group is limited to from about $C_{11}$ to $C_{14}$ or, even more desirably, from $C_{11}$ to $C_{13}$. For detergent applications, the paraffin mixture will have, in most instances, an average chain length of from $C_{10}$ to $C_{15}$ with not more than 2 to 3 carbon atoms spread on either side of the mean.

Except for the use of the catalyst prepared as described in this invention, the dehydrogenation step can be conventional. In most instances, a continuous dehydrogenation conducted with the long-chain paraffins in the vapor phase is most advantageous and, due to the high specific activity of the catalyst of the present invention, can be satisfactorily conducted without excessive cracking or cyclization of the paraffin feed material. The temperature of the catalyst material and of the hydrocarbon feed stock in contact with the catalyst can satisfactorily range from about 400°C. to about 650°C. with the preferred temperature range being, in most instances, from 420° to 520°C. At temperatures below about 400°C. the reaction rate is undesirably slow and at temperatures above 650°C. excessive side reactions occur. The reaction can be conducted at any suitable pressure from about one-half to about ten atmospheres, but it is preferred to conduct the reaction at from about 1 to about 3 atmospheres.

The hydrocarbon vapors brought into contact with the dehydrogenation catalyst in accordance with the present invention are preferably diluted with hydrogen since it has been found that the presence of hydrogen in the feed stream, at least in some instances, favors the formation of mono-olefins and reduces the deposition of carbon on the catalyst. The ratio of hydrogen to hydrocarbon material in the feed stock can be varied within relatively wide limits and, for example, the mole ratio of hydrogen to saturated hydrocarbon may suitably range from about 0.1 to 50 to 1. However, it is seldom advantageous to employ a hydrogen to saturated hydrocarbon mole ratio greater than about 10 to 1 and the preferred mole ratio of hydrogen to saturated hydrocarbon is from about 1:1 to about 5:1.

The LHSV can vary with wide limits and, for example, the LHSV can range from about 1.0 to about 100 cc/cc/hr. If the LHSV is higher than about 100 cc/cc/hr., the degree of conversion is so small as to require an impractical degree of recycling through the catalyst bed, and if the LHSV is substantially lower than about 1.0 cc/cc/hr., the formation of excessive amounts of byproducts is promoted. The preferred LHSV is from about 5 to about 50 cc/cc/hr.

The catalyst used in accordance with the present invention can comprise any combination of one or more Group IB metals or their oxides and one or more noble metals or oxides of the platinum or palladium families, provided that the metals are properly deposited in the correct ratios and amounts on a proper alumina catalyst base. The alumina used as a catalyst base, in accordance with the present invention, is required to have certain chemical and physical properties. The alumina catalyst base must withstand the conditions that it will be subjected to in preparation, use, or regneration. In addition, the alumina catalyst base, after calcination, must have a surface area between about 10 $m^2/g$ and about 150 $m^2/g$ and preferably should have a surface area between about 25 $m^2/g$ and about 120 $m^2/g$. There is no upper limit as to the surface area per gram that the alumina catalyst base can have before calcination, but it is difficult to prepare an alumina catalyst base which is thermally stable and which has a surface area before calcination of above about 450 $m^2/g$, so that this constitutes a practical upper limit. Similarly, the alumina catalyst base must have a macropore volume of at least 0.05 cc/g. There is no upper limit as to the macropore volume that the alumina catalyst base can have as long as the requirements set forth above are met.

The alumina catalyst base can have any suitable physical form and, for example, may suitably be in the form of spheres, cylindrical tablets or aggregates having mean diameters of from about 1/64 to ½ inch. Particle size, however, is of secondary importance as long as the other requirements set forth herein are met and the alumina catalyst base particles can have almost any convenient mean diameter.

It is important in the process of the present invention to reduce the surface area of the alumina catalyst base to less than about 150 $m^2/g$. As is known to those skilled in the art, if the alumina catalyst base has a surface area of less than about 10 $m^2/g$, the resulting catalyst is not sufficiently active to prepare mono-olefins economically. On the other hand, it was surprisingly found by the process of the present invention that if the alumina catalyst base had a surface area of greater than about 150 $m^2/g$, the amount of byproducts formed during the dehydrogenation reaction increased. Thus, the surface area of the alumina catalyst base should be maintained between about 10 $m^2/g$ and 150 $m^2/g$, and it is preferred to maintain the surface area between about 25 $m^2/g$ and 120 $m^2/g$.

To prepare the alumina catalyst base for the process of this invention, the alumina catalyst base is heated to a temperature of about 800°C., not only to insure that the alumina is thermally stable under the conditions of preparation, use or regeneration of the catalysts, but also to reduce the surface area to about 150 $m^2/g$ or lower. At calcination temperatures of less than about 800°C., the desirable effects that are achieved by the catalysts of this invention are not achieved. On the other hand, calcining for too long or at too high a temperature can sinter the alumina to the extent that it is unsatisfactory for use as an alumina catalyst base. It is preferred to use temperatures between about 800°C.

and about 1200°C, and it is even more preferred to use temperatures between about 900°C. and about 1100°C.

The time and temperature of the calcination affects the surface area of the alumina catalyst base. The time and temperature required to reduce the surface area to less than about 150 m²/g, and preferably to less than 120 m²/g, according to the present invention, can be readily determined by surface area measurements, as will occur to those skilled in the art. Generally, calcination at about 1000°C. for about 30 minutes is sufficient. Calcining for up to 25 hours does not seem to be beneficial, although calcining for such a long time is not harmful, particularly at lower temperatures, say 800°C.

After the alumina catalyst base has been calcined, it is then checked for acidity factor. The acidity factor is determined by placing the calcined alumina catalyst base in a reactor at a temperature of 435° to 440°C. while contacting the alumina catalyst base in the reactor with a hydrocarbon mixture of 92 weight % n-dodecane and 8 weight % n-alphadodecene admixed with hydrogen in a mole ratio of 2 parts hydrogen to 1 part hydrocarbon mixture. The hydrocarbon-hydrogen mixture should be passed over the alumina catalyst base under a pressure of 760 torr (±20 torr) and at a LHSV of 4.65 cc/cc/hr. After the hydrocarbon mixture has been passed over the alumina catalyst base, the hydrocarbon mixture is then analyzed by gas chromatography in which the chromatographic column is packed with a substrate for separating the mixture according to boiling point and polarity. A suitable and preferred substrate for the chromatographic column is 1% by weight silver nitrate plus 18% by weight Carbowax 20 M polyethylene glycol in Chromosorb W diatomaceous earth. The numerical value of the weight % material, based on the total weight of the hydrocarbon mixture introduced into the column, which is eluted from the column prior to n-dodecane represents the "acidity factor" as this term is employed herein. The acidity factor should be no greater than 2.0 weight % and preferably not in excess of 1.0 weight %. If the alumina catalyst base has an acidity such that a large amount of cracking results, the acidity of the support material is unsatisfactory for use in accordance with the present invention.

After the alumina catalyst base has been calcined, it can be used to prepare the catalysts of the present invention in a straight-forward manner, as will occur to those skilled in the art. The Group IB metal or Group IB oxide can be copper, silver or gold, or oxides of copper, silver and gold. Silver or silver oxide provides excellent results although in most instances copper or silver or mixtures thereof are preferred. Because of its low price and ready availability, copper is preferred. The amount of Group IB metal or IB metal oxide deposited on the surface of the catalyst base can be varied within wide limits. As little as about 0.002% by weight of a Group IB metal will provide an improved catalyst according to the process of this invention. On the other hand, as much as 25 to 50% by weight of the Group IB metal or metal oxide can be used on the alumina catalyst base, although such large amounts are not generally advantageous since the use of such large amounts tends to reduce the available surface area of the catalyst. It is seldom advantageous to employ more than about 10% by weight of the Group IB metal or metal oxide, based on the overall weight of catalyst. The preferred amount of Group IB metal or metal oxide is generally from about 0.1% to about 4% by weight.

The noble metals of the platinum or palladium families for use in preparing a catalyst in accordance with the present invention include iridium, osmium, palladium, ruthenium, rhodium, platinum, or mixtures thereof. The preferred noble metal is platinum. As little as 0.005% noble metal or nobel metal oxide based on the overall weight of the catalyst material is required to product acceptable results. It is preferred to use at least about 0.02% by weight and preferably about 0.1% by weight. Excess noble metal is not detrimental to the activity or selectivity of the catalyst, and if desired one can use as much as about 5% by weight of noble metal or noble metal oxide although there is seldom, if ever, any advantage in utilizing a catalyst which contains more than about 1 or 2% by weight of noble metal or noble metal oxide.

The Group IB metals and the noble metals of the platinum and palladium families can be deposited upon the alumina catalyst base according to the present invention either in the metallic form or as metal oxides. Since the catalyst is normally employed for dehydrogenation in a reducing atmosphere, even if the metals in the catalyst are initially present as oxides, at least a surface layer of elemental metal is present on the metallic deposits during use of the catalyst.

The catalyst of the present invention can be prepared by any number of means known to those skilled in the art. For example, the metals or metal oxides can be deposited on the alumina catalyst base in any sequence, either before or after the alumina catalyst base is calcined, although it is preferred to calcine the alumina catalyst base before the metals or oxides are deposited. As an example, the metals can be vaporized and deposited on a cooled alumina catalyst base in the correct proportions. However, it is preferred to immerse the alumina catalyst base in a solution or solutions of heat decomposable salts of the metals to be employed, and thereafter, heating the impregnated alumina catalyst base containing the heat decomposable salts to liberate the metals on the base. The Group IB metal or metals and the noble metal or metals can be deposited simultaneously by using a solution containing salts of both or, alternatively, the Group IB metal can be applied and the intermediate catalyst material heated at a high temperature to result in decomposition of the Group IB metal salt and the calcined material thereafter impregnated with a solution of one or more noble metal salts, and this is the procedure that is preferred. On the other hand, the noble metal can be first applied followed by the application of the Group IB metal or metals.

The preferred Group IB salts are the nitrates such as copper nitrate, silver nitrate, and the like, or the basic carbonates of these metals dissolved in ammonium hydroxide solution. Nitrates are preferred. The preferred noble metal salts are the diamino dinitrites such as platinum diamino dinitrite and palladium diamino dinitrite and the noble metal amino hydroxides such as platinous dihydroxydiamine and palladium dihydroxydiamine. These noble metal salts can be advantageously applied to the alumina catalyst base from a solution in aqueous ammonium hydroxide.

As is known to those skilled in the art, an alkali metal can optionally be used with the noble metal and the metal or metal oxide of the Group IB elements in a dehydrogenation catalyst. When an alkali metal is used in the present catalyst composition, at least 0.01% by weight of the total catalyst composition is necessary and it is preferred to use an alkali metal concentration within the range of 0.01 to 20% by weight. It is more preferred that the amount of the alkali metal present in the catalyst be within the range of from approximately 0.02 to 5% by weight of the total catalyst composition. If an alkali metal is used in addition to the noble metal and metal or metal oxide of the Group IB elements, it is usually preferred that the alkali metal be incorporated into the catalyst prior to impregnation of the alumina catalyst base with the noble metal. The alkali metal may be incorporated by co-precipitation, impregnation or other convenient method. Among the alkali metals useful in the present invention are sodium, potassium, lithium, rubidium and cesium. Sodium and potassium are preferred.

Following the dehydrogenation of the paraffins according to the process of the present invention, the monoolefins are separated from the other components of the reaction mixture and recovered by any suitable procedure as might occur to one skilled in the art. The preferred procedure for separating mono-olefins from unreacted hydrocarbons comprises reacting the mono-olefins with a selected aromatic hydrocarbon in the presence of unreacted paraffins and thereafter separating the resulting alkyl aromatics from the unreacted paraffins by distillation.

Any suitable aromatic hydrocarbon can be employed for reaction with the mono-olefins produced in accordance with the present invention and examples of suitable aromatic hydrocarbons include toluene, xylene, cumene and other lower alkylbenzenes in which the number of alkyl side chains is not in excess of about 2 and the alkyl chain-length in each instance is not in excess of 4 carbon atoms. The preferred aromatic is benzene.

The alkylation reaction can be conducted in a conventional manner as is known to those skilled in the art utilizing any Friedel-Crafts catalyst such as aluminum chloride, boron trifluoride, hydrogen fluoride and the like. The preferred alkylation catalyst is hydrogen fluoride. The specific reaction temperature for the alkylation reaction depends upon the particular alkylation catalyst and other considerations but in most instances will range from about −20°C. to +80°C. Using hydrogen fluoride as an alkylation catalyst, a reaction temperature of −10°C. to about +10°C. is generally used unless a higher temperature is desired to reduce the formation of organic fluorine-containing compounds.

The ratio of catalyst to olefins is conventional as will occur to those skilled in the art and the preferred ratio will depend upon the particular alkylation catalyst employed. When employing a hydrogen fluoride alkylation catalyst, the molar ratio of olefin to catalyst can range from about 1:5 to about 1:25 with the preferred ratio being about 1:15 to about 1:20.

The alkylation reaction can be conducted under a wide range of pressures as will occur to those skilled in the art. Satisfactory results can be obtained at pressure ranging from 0.1 to 10 atmospheres or higher, but the alkylation reaction can be satisfactorily conducted at substantially atmospheric pressure.

As is known to those skilled in the art, it is generally advantageous to employ an excess of the aromatic reactant to minimize the formation of byproducts in which a single aromatic nucleus is substituted with a plurality of alkyl groups. Because of the larger quantities of material which must be handled, it is generally impractical to employ an aromatic to olefin ratio of more than about 30:1 and it is seldom advantageous to employ an aromatic to olefin ratio in excess of about 10:1. On the other hand, an aromatic to olefin ratio of as low as 1:1 can be used if a reaction product containing a relatively high percentage of poly-substituted aromatics is acceptable. A molar ratio of aromatic reactant to olefin of at least about 5:1 is preferred.

DESCRIPTION OF THE PREFERRED EMBODIMENTS

This invention is illustrated by but not limited to the following examples.

EXAMPLE I

This Example illustrates the results that are obtained when a paraffin is contacted with a catalyst prepared according to the teachings of the prior art.

In a furnace having the capability of heating to 1100°C. about 100 parts of KA 101 alumina pellets (available commercially from Kaiser Aluminum Company) having a diameter of about 0.2 to about 0.4 centimeters, a surface area of about 296 $m^2/g$ as determined by the Brunauer-Emmett-Teller nitrogen adsorption method, and a macropore volume of about 0.18 cc/g were calcined for 2 hours at about 600°C. The surface area of the alumina was redetermined and found to be about 190 $m^2/g$. The macropore volume of the alumina did not change.

About 500 parts of the calcined alumina pellets were placed in a suitable vessel equipped with low velocity stirrer. Then, a copper nitrate solution containing 10 parts by weight copper was added while agitating to saturate the alumina pellets with a copper nitrate solution. The treated alumina pellets were dried at about 120°C. for about 16 hours and calcined at about 430°C. for 2 hours and allowed to cool. The cooled alumina pellets were placed again in the vessel and agitated gently with an ammoniacal solution of platinum diamino dinitrite containing about 2.5 parts by weight platinum, diluted to a volume required to saturate the alumina pellets. The alumina pellets were then dried at 120°C. for 16 hours and calcined at about 430°C. for 2 hours. The treated alumina pellets contained about 1.4 grams copper and about 0.35 grams platinum per 100 cc (about 70 g) catalyst.

The catalyst was then placed in a laboratory reactor maintained at about 440°C. and a feed gas of hydrogen and normal dodecane (99% pure) having a hydrogen to paraffin molar ratio of 8:1, was passed through the reactor at an LHSV of 32 cc/cc/hr, and at a pressure of 1.68 atmospheres absolute. Liquid samples were emptied from the product collector from the reactor between the 34th and 46th hours of the run and were analyzed by mass-spsectrometry and gas-liquid chromotography with the following results. Light ends, 0.1%; mono-olefin, 10.6%; triolefins and aromatics, 0.3%.

EXAMPLE II

This Example illustrates the results that are obtained when a paraffin is contacted with a catalyst prepared according to the teachings of the present invention.

The procedure of Example I was repeated except that the alumina pellets were calcined at 1000°C. for 6 hours. The surface area of the calcined alumina was reduced from about 296 $m^2/g$ to 48 $m^2/g$ and the macropore volume was increased from 0.18 to 0.25 cc/g. The dehydrogenation reactor was maintained at 450°C. Liquid samples emptied from the product collector from the reactor between the 6th and 10th hours of the run were analyzed with the following results. Light ends, not detectable; mono-olefin, 10.6%; triolefins and aromatics, 0.1%.

Thus, it can be seen that at same mono-olefin conversion, the impurity level in the mono-olefin was reduced four-fold by the use of the catalyst of the present invention.

EXAMPLE III

This Example illustrates the results that are obtained when a paraffin is contacted with a catalyst prepared according to the teachings of the prior art using a different alumina catalyst base.

The procedure of Example I was repeated except that the alumina catalyst base was SAS alumina pellets (available commercially from Kaiser Aluminum Company) having a diameter of about 0.2 to 0.4 centimeters, a surface area of about 222 m$^2$/g, and a macropore volume of 0.18 cc/g. After calcination for 2 hours at about 600°C. the surface area of the alumina was about 206 m$^2$/g, and the macropore volume was 0.19 cc/g.

The dehydrogenation was carried out at 430°C. at an LHSV of 15 cc/cc/hr, a hydrogen to paraffin molar ratio of 2, and at a pressure of 1.27 atmospheres absolute.

Liquid samples emptied from the product collector from the reactor between the 24th and 26th hour of the run were analyzed with the following results. Mono-olefins, 13.1%; triolefins and aromatics, 0.7%.

EXAMPLE IV

This Example illustrates the results that are obtained when a paraffin is contacted with a catalyst prepared according to the teachings of the present invention using a different alumina catalyst base.

The procedure of Example III was repeated except that the alumina was calcined. After calcination at 1000°C. the surface area of the alumina pellets was 80 m$^2$/g and the macropore volume was 0.20 cc/g.

Liquid samples emptied from the product collector between the 24th and 26th hour were analyzed with the following results. Mono-olefins, 13.2%; triolefins and aromatics, 0.3%. Thus, it can be seen that at same mono-olefin conversion in Examples III and IV, the triolefin and aromatics formation was reduced two-fold when using a calcined alumina catalyst base.

The results in Examples I through IV, using the laboratory reactor, are comparable to those that would be obtained in a commercial production facility.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. The process for producing mono-olefins from paraffins having a chain length of from about 8 to about 24 carbon atoms which comprises passing a mixture of paraffins and hydrogen at an LHSV of from about 1 to about 100, at a temperature of from about 400°C. to about 650°C. in contact with a catalyst comprising from about 0.002 weight percent to about 5 weight percent of a first component selected from the group consisting of Group IB metals, oxides of Group IB metals, and mixtures thereof; from about 0.005 weight percent to about 5 weight percent of a second component selected from the group consisting of noble metals of the platinum and palladium families, noble metal oxides of the platinum and palladium families, and mixtures thereof; the first and second components being deposited on the surface of an alumina catalyst base having a surface area of at least 10 square meters per gram, an acidity factor less than 2.0, and a macropore volume of at least 0.005 cc/g; wherein the improvement comprises calcining the alumina catalyst base at a temperature of at least about 800°C. for a sufficient time to reduce the surface area of the alumina catalyst base to less than 150 m$^2$/g.

2. The method of claim 1 wherein the alumina catalyst base is calcined at a temperature between about 800°C. and about 1200°C.

3. The method of claim 1 wherein the alumina catalyst base is calcined for a sufficient time to reduce the surface area of the alumina catalyst base to less than 120 m$^2$/g.

4. The method of claim 1 wherein the improvement comprises calcining the alumina catalyst base at a temperature between about 900°C. and 1100°C.

5. The method of claim 1 wherein the first component comprises from about 0.1 weight percent to about 4 weight percent of said catalyst and is copper.

6. The method of claim 1 wherein the second component comprises from about 0.1 weight percent to about 2 weight percent of said catalyst and is platinum.

7. The method of claim 1 wherein from about 0.01 weight percent to about 20 weight percent of an alkali metal is deposited on the alumina catalyst base.

8. The method of claim 7 wherein the alkali metal is selected from the group consisting of sodium and potassium.

9. The method of claim 1 wherein said first component is copper and said second component is platinum.

10. The method of claim 9 wherein the catalyst comprises from about 0.1 weight percent to 4 weight percent of said first component and from about 0.1 weight percent to 2 weight percent of said second component and wherein from about 0.01 weight percent to 20 weight percent of an alkali metal selected from the group consisting of sodium and potassium is deposited on said alumina catalyst base, said alumina catalyst base being calcined at a temperature between about 900°C. and 1100°C. for a sufficient time to reduce the surface area of said alumina catalyst base to less than 120 m$^2$/g.

* * * * *